(12) United States Patent
O'Rourke

(10) Patent No.: US 8,297,630 B2
(45) Date of Patent: Oct. 30, 2012

(54) BI-DIRECTIONAL PROPULSION CASTER

(75) Inventor: Thomas J. O'Rourke, Harlingen, TX (US)

(73) Assignee: James Patrick O'Rourke, Brentwood, TN (US)

( * ) Notice: Subject to any disclaimer, the term of this patent is extended or adjusted under 35 U.S.C. 154(b) by 0 days.

(21) Appl. No.: 13/463,699

(22) Filed: May 3, 2012

(65) Prior Publication Data

US 2012/0217721 A1 Aug. 30, 2012

Related U.S. Application Data

(63) Continuation of application No. 12/433,568, filed on Apr. 30, 2009.

(60) Provisional application No. 61/049,125, filed on Apr. 30, 2008.

(51) Int. Cl.
*B62M 1/00* (2010.01)

(52) U.S. Cl. .................................... 280/87.042

(58) Field of Classification Search .............. 280/11.27, 280/11.28, 87.041, 87.042, 87.043, 7.13, 280/7.14, 14.21, 14.24, 14.25, 14.26; 16/18 R, 16/19, 20, 22, 23, 32, 33, 34, 367

See application file for complete search history.

(56) References Cited

U.S. PATENT DOCUMENTS

| 7,195,259 B2 * | 3/2007 | Gang ..................... 280/87.042 |
| 7,775,534 B2 * | 8/2010 | Chen et al. ............. 280/87.042 |
| 2005/0028319 A1 | 2/2005 | Schreiber |
| 2006/0213711 A1 | 9/2006 | Hara |

FOREIGN PATENT DOCUMENTS

| DE | 9211745 | 11/1992 |
| WO | WO 9915346 A1 * | 4/1999 |
| WO | WO 2006121257 A1 * | 11/2006 |
| WO | 2009135041 | 11/2009 |

OTHER PUBLICATIONS

International Search Report for PCT Publication No. WO 2009/135041.
International Preliminary Report on Patentability for PCT Publication No. WO 2009/135041.
European Search Report and Opinion for EP 2285593.
Claims from EP 2285593.

\* cited by examiner

*Primary Examiner* — Joseph Rocca
(74) *Attorney, Agent, or Firm* — Shane Cortesi

(57) ABSTRACT

A bidirectional propulsion caster assembly is disclosed for enabling a rider to generate bi-directional motion from a ride-on device. A mounting bracket is attachable to the bottom of the device and defines a pivot axis extending in a generally transverse direction across the bottom of the device. A rocker bracket and caster shaft having a caster shaft axis are attached to the mounting bracket and pivot about the pivot axis along an arc between first and second positions. A wheel bracket is mounted to and rotates about the caster shaft. A wheel is mounted to the wheel bracket for rotation about a wheel axis angularly offset from the caster shaft axis. One or more changeable pivot stops may be attached to the rocker bracket or the mounting bracket and effective to further define the available arc of rotation.

19 Claims, 5 Drawing Sheets

BI-DIRECTIONAL PROPULSION CASTER

CROSS-REFERENCES TO RELATED APPLICATIONS

This application is a continuation of U.S. application Ser. No. 12/433,568, filed Apr. 30, 2009, which claims the benefit of U.S. Provisional Application No. 61/049,125, filed Apr. 30, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to caster assemblies. More particularly, in various embodiments, the present invention relates to caster assemblies for use with ride-on devices. Even more specifically, this invention, in particular embodiments, pertains to an adjustable rocking action caster assembly for improved performance of recreational skateboards, caster boards, and the like.

There are numerous ride-on devices in the marketplace. Ride-on devices take many forms and may be used for exercise, entertainment or both. They may have a non-descript, mostly functional aesthetic form, like a skateboard or scooter, or they may be made to look like a vehicle, an animal or, a fictional character as with many preschool toys.

Conventional skateboards are generally supported by two-wheeled truck assemblies attached to the undersides of the boards. Such skateboards have long been popular, but are limited in the sense that the rider could realistically accelerate on a level or uphill surface only by removing one of his or her feet from the board and pushing off the ground. Typically such skateboards were also limited in the degree of steering that was possible, as where the turning radius reached a certain angle, the wheels would touch the board.

There is a desire and need in the marketplace for ride-on products that can be propelled in a way that is more novel than simply pushing off, and that may provide sharper turns if desired.

Caster boards were subsequently developed to address the limitations of skate boards. U.S. Pat. No. 7,195,259 provides certain examples of caster, boards. Caster boards typically have comprised one or two boards, with at least one swivel caster wheel assembly in front and at least one in the rear of the caster board. The rider twists his or her body to the left and to the right to accelerate the caster board or to turn it within a relatively small turning radius. This is accomplished by having the wheels rotate around the wheel axis when the board is twisted in either direction, where the wheel axis is mounted at an acute angle with respect to the bottom, front and back of the caster board.

In these prior art caster boards, the distance from the bottom side of the board to the contact point of the wheel to the riding surface increases as the wheel bracket rotates around the axis in either direction from its lowest forward facing position until the distance reaches maximum when the wheel bracket is rotated 180 degrees from its neutral position. Propulsion is a resultant force causing the wheels to move along the riding surface according to their bias as a rider applies a force to twist the board and cause the casters to rotate around the axis. In common caster boards this action will produce propulsion in the general direction opposite of the acute angle formed by the wheel axis to the board. These prior art caster boards have a defined front and a defined back. The front and back are defined by the acute angle of the wheel axis. When the wheel bracket is rotated 180 degrees around the axis, the distance between the bottom side of the board and the point where the wheel contacts the riding surface is at its maximum. Because there is no force to bias the wheels against, propulsion in this direction is not possible. Therefore, the prior art caster board has a defined front and back and are unidirectional with regard to propulsion.

In contrast, skateboards and the art of skateboarding have benefitted in regard to the tricks able to be performed and their subsequent popularity by their ability to go either direction with equal capability. Therefore it would be beneficial to the art if a caster board could be bidirectional and travel in either direction with equal capability.

Moreover, in common prior art caster boards, the angle of the wheel axis cannot be adjusted by the rider according to his skill level, chosen activity or preference. In contrast, many sport type ride-on devices, such as BMX bicycles and common skateboards, retain the interest of the user partly due to the fact they can be customized to affect performance via changeable parts such as sprockets, trucks and other paraphernalia.

Typical prior art caster boards have a front and a back defined by its ability to propel itself in a general direction which is determined by the acute angle at which the wheel axis is mounted. This design limits caster boards to be unidirectional and leaves a desire in the marketplace unfulfilled.

Some ride-on devices have used a spring to work against the rotation of the wheel assembly along the wheel axis, thus creating a force that replaces the gravitational force used in other prior art devices. This method still provides forward motion resulting from side-to-side, or twisting, forces applied by the rider. However, this does not allow full rotation of the wheel assembly which limits the maneuverability of the ride-on device. Moreover, the spring has a set tension so performance varies greatly with the weight of the rider.

It is desirable therefore to provide a caster assembly that permits full rotation of the wheel for bi-directional propulsion. This improved performance may include sharper turns, bi-directional travel, and user-adjustable components for various preferences and/or skill levels as examples. Other needs and potential for benefit may be apparent to persons of skill in the art having studied this document.

BRIEF SUMMARY OF THE INVENTION

It is an object of some embodiments of this invention to provide a caster assembly for ride-on devices such as caster boards that uses a rocking caster to permit bidirectional propulsion, improve performance, or both, for example, for riders of all sizes. Some embodiment may have other objects or benefits, some of which may be apparent from this document.

In accordance with some embodiments of the invention, a caster assembly includes a wheel bracket, a wheel attached to the wheel bracket, a rocker/shaft assembly about which the wheel bracket is free to rotate, a mounting bracket attached to the underside of a ride-on device and connected to the rocker/shaft assembly, and one or more pivot stops to dictate the limits of the rocker/shaft assembly movement, for example.

In some embodiments, the wheel assembly is attached to a caster shaft which rocks on the bracket by pivotally attaching to the mounting bracket.

When forces applied by the rider cause the wheel bracket to rotate 90 degrees about the shaft, the rocker becomes level allowing for dynamic spins and other tricks. When the rider applies forces which cause the wheel bracket(s) to rotate around the shaft more than 90 degrees, the entire caster assembly rocks on the pivot-bracket connection creating a new low point 180 degrees around the caster from the previous low position. This allows the board to have no discernable front or back with regard to propulsion and performance. This is accomplished by mounting the caster so that it does not have a constant acute angle in respect to any given point on the bottom side of the board.

The rocking action of the assembly positions the caster to accelerate in either direction by rocking when the wheel bracket rotates more than 90 degrees from the low point on its rotation to create a new low point within 90 degrees. Therefore, the wheel bracket never travels 180 degrees from the low point where propulsion is no longer possible as with conventional caster boards.

Thus, mounting the shaft or axis so it can swing its angle from acute to obtuse relative to a vector from one end of the board to beneath the shaft, rather than mounting the shaft at an acute angle with regard to a front and a back, creates a caster board with no front and no back that can go either direction with equal capability.

The rocker/shaft assembly of the present; invention can be designed to interface with the bottom side of the board or the bracket so that the swing could be restricted to the desired amount. In some embodiments, a separate piece such as a pivot stop can be introduced to dictate the where and how of this interface. The where could be dictated by the shape of pivot stop and the how can be dictated by the choice of materials. In some embodiments, the pivot stops may be made from urethane or other material that has rebound qualities.

Moreover, using a separate part allows the option to change this part to modify the total swing angle and therefore the performance of the device.

Through the use of various embodiments of the invention, forward motion may be easier to maintain than it is to initiate. Further, in a number of embodiments, the caster assembly further permits the rider to travel backwards as well as forwards. In different embodiments, the pivot stops may comprise a wide variety of configurations and some embodiments may be easily changeable by the rider to accommodate various user preferences and skill levels.

In accordance with other embodiments of the caster assembly, the rocker/shaft assembly may interface directly with the bottom side of the ride-on device or the main bracket to restrict the swing of the rocker/shaft assembly. Also the main bracket may attach to the rocker/shaft assembly with one or more pivot bolts or pins but in every case it will be a common axis between these pins/bolts.

While many ride-on devices as contemplated by this invention may require more than one wheel to operate, only one propulsion caster assembly as described may be required. However, the various caster assemblies of the present invention may be used in a variety of combinations with a variety of ride-on devices in some embodiments. The caster assembly may, in addition, comprise a blade instead of a wheel where the ride-on device is to be used on ice. Further, the caster assembly may conceivably be used with devices that are not intended to be ridden such as carts or wagons, as examples.

DETAILED DESCRIPTION OF THE INVENTION

Figure 1:
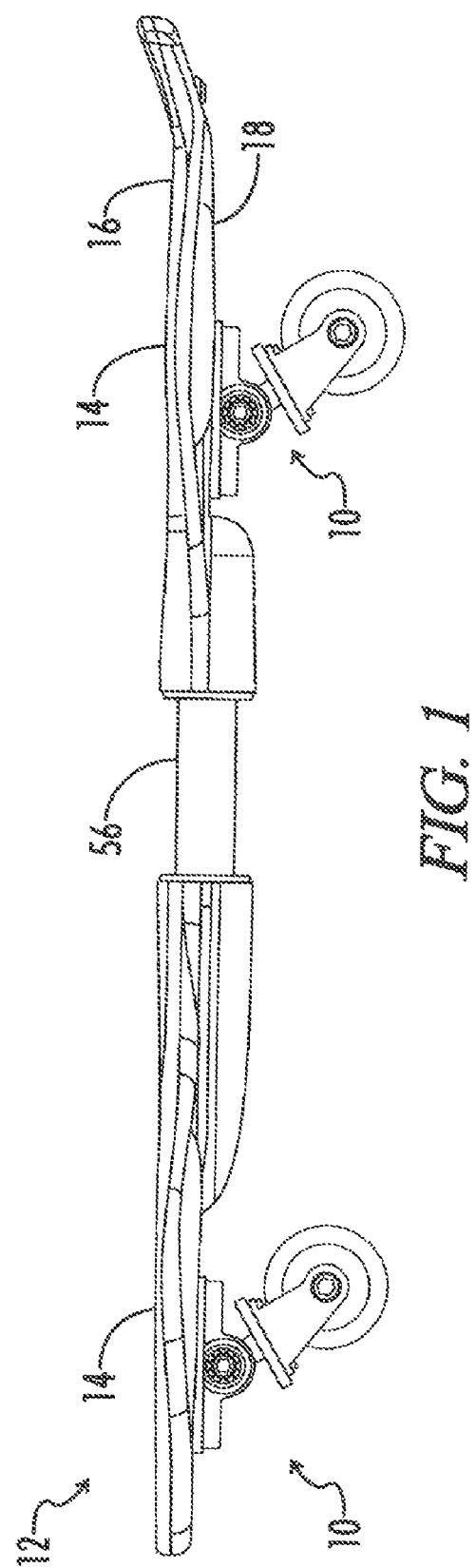
FIG. 1 is a side view of an embodiment of a ride-on device having bi-directional propulsion caster assemblies attached.

One embodiment of the invention is disclosed in FIG. 1. In this embodiment, a bidirectional propulsion caster assembly 10 is presented for use with a ride-on device 12 having at least one base 14. Each base 14 has a top side 16 for supporting the feet of a rider and a bottom side 18 to which the caster assembly 10 is attachable.

Figure 2A:
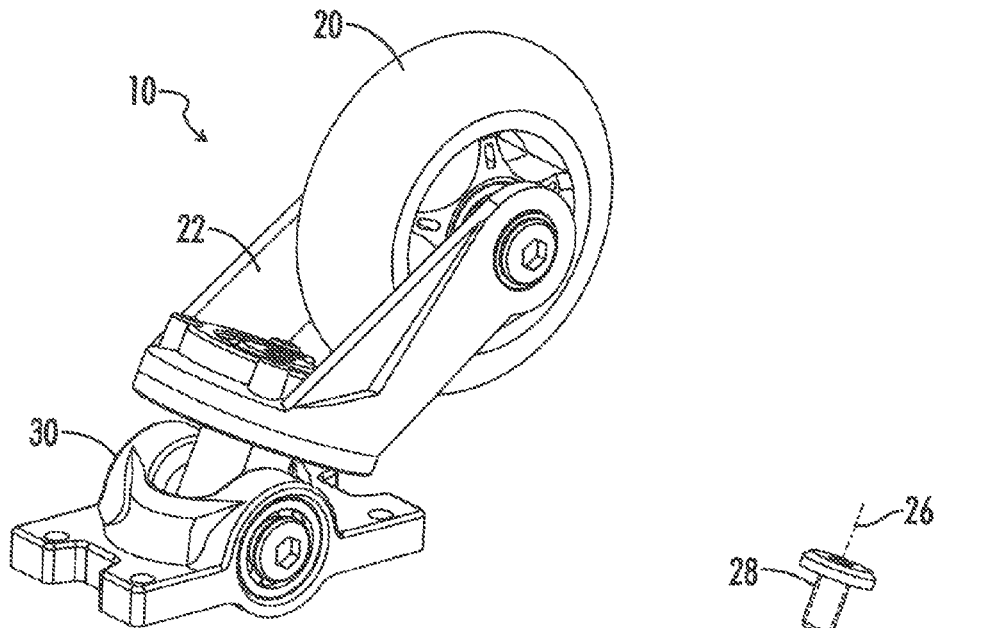
FIG. 2A is an isometric view of an embodiment of the caster assembly of the invention.
Figure 2B:
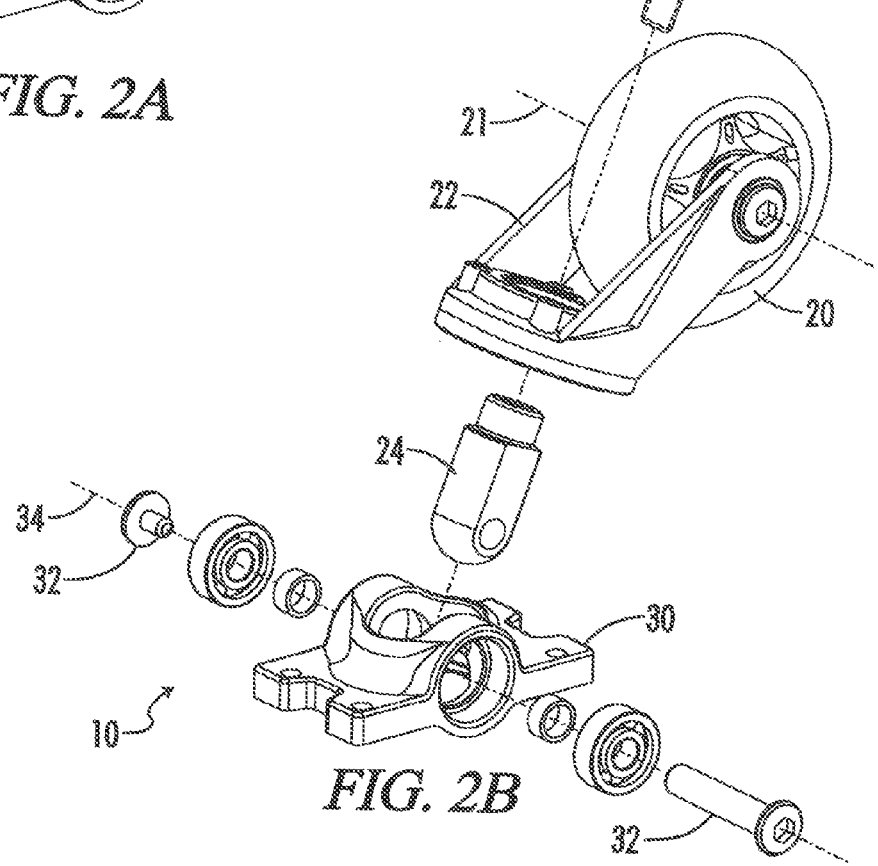
FIG. 2B is an exploded isometric view of the caster assembly of FIG. 2A.

Referring now to FIGS. 2A and 2B, in the embodiment illustrated, the caster assembly 10 includes a wheel 20 supported by a wheel bracket 22. The wheel 20 is attached so as to rotate freely along its entire circumference. The wheel further rotates freely about a wheel axis 21. The wheel bracket 22 is rotatably connected to a caster shaft 24 having a caster shaft axis 26 that is angularly offset from the wheel axis 21. In this embodiment the caster shaft 24 is connected to the wheel bracket 22 using a wheel bracket bolt 28. The wheel 20 and the wheel bracket 22 are free to rotate around the caster shaft 24 and about the caster shaft axis 26. The benefits of the angularly offset wheel axis 21 from the caster shaft axis 26 will be discussed below.

Still referring to FIGS. 2A and 2B, in the embodiment illustrated, mounting bracket 30 is attachable to the bottom side 18 of the base 14 with caster shaft 24 pivotally connected to the mounting bracket 30. In this embodiment the pivotal connection includes a pivot assembly 32 having a pivot pin 32 or bolt 32 connected to the mounting bracket 30 using various fastening components as known in the art. The pivot assembly 32 in various embodiments may comprise bushings, washers, bearings, and the like such that the caster shaft 24 is adequately permitted to pivot about the pivot assembly 32. The mounting bracket 30 and the pivot pin 32 further define a pivot axis 34 that extends in a generally transverse direction across the bottom of ride-on device 12 when the caster assembly 10 is attached to the ride-on device 12.

Figure 3:
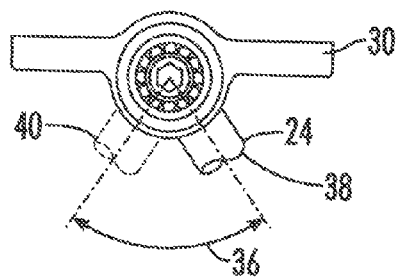
FIG. 3 is an exploded side view of the caster shaft of FIG. 2A demonstrating the permissible arc of rotation of the caster shaft.

Referring now to FIG. 3, the caster shaft 24 is attached to the mounting bracket 30 so that the caster shaft 24 can pivot about the pivot axis 34 along an arc 36 between a first position 38 and a second position 40. In this embodiment the mounting bracket 30 may be shaped such that the wheel assembly 22 or the caster shaft 24 engage the mounting bracket 30 at either end of the arc 36, thereby defining the first position 38 and the second position 40. In other embodiments, the wheel assembly 22 may be shaped so as to engage the bottom side 18 of the base 14 at either end of the arc 36, or various alternative configurations that may be anticipated for defining the first position 38 and the second position 40.

The caster shaft 24 and a laterally extending plane corresponding to the pivot axis of the caster shaft 24 together form an angle with respect to either direction of movement for the ride-on device 12. The angle is not fixed at an acute angle with respect to any given direction of movement, but may instead be acute or Obtuse depending on whether the caster shaft 24 is in the first position 38 or the second position 40. Pivoting of the caster shaft 24 between the first 38 and second position 40 further causes the caster shaft axis 26 to extend on opposing sides of an axis perpendicular in relation to a horizontal plane of the base 14 of the ride-on device 12.

Figure 4A:
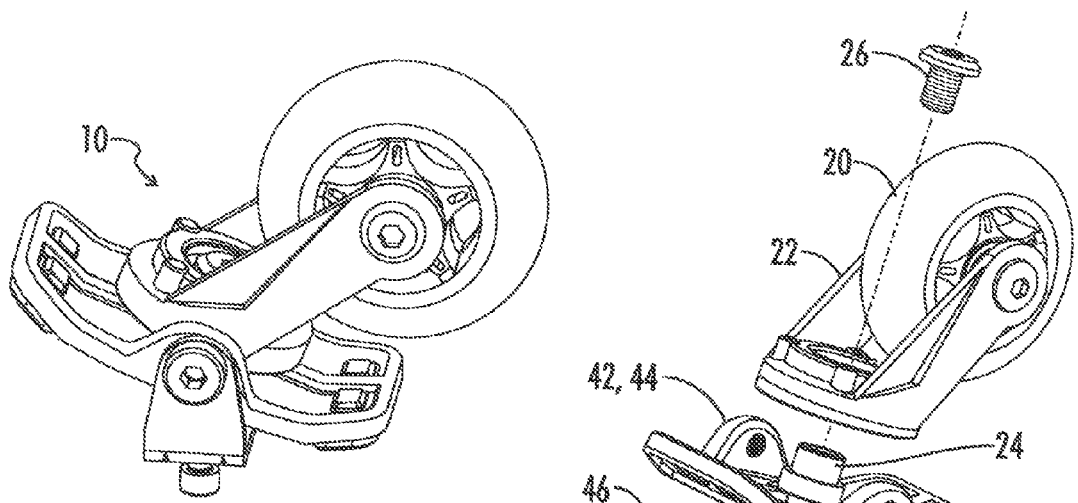
FIG. 4A is an isometric view of another embodiment of the caster assembly of the invention.
Figure 4B:
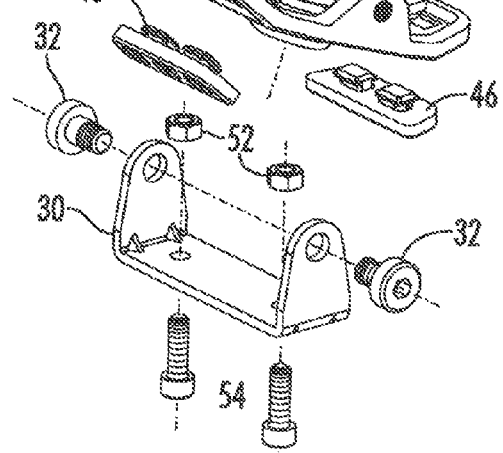
FIG. 4B is an exploded isometric view of the caster assembly of FIG. 4A.

Referring now to FIGS. 4A and 4B, in an embodiment as illustrated a rocker bracket 42 rather than the caster shaft 24 is pivotally attached to the mounting bracket 30. The caster shaft 24 is attached to the rocker bracket 42 that the caster shaft 24 and rocker bracket 42 are together able to pivot along the arc 36 between the first position 38 and the second position 40 previously defined. In some embodiments, the caster shaft 24 and rocker bracket 42 may be integrally formed from a single material to define a single rocker/shaft assembly 44. In this embodiment, the rocker bracket 42 or rocker/shaft assembly 44 may engage the bottom side 18 of the base 14 when it pivots in either direction along the defined arc, the engagement; thereby defining the first position 38 and the second position 40. In other embodiments the rocker bracket 42 or rocker/shaft assembly 44 as shown may engage the mounting bracket 30 when it pivots to the first or to the second position. The mounting bracket 30 in these embodiments may be shaped in any number of configurations so as to selectably define the arc of rotation.

The pivotal connection in this embodiment is created by a pair of pivot bolts 32 engaging the rocker bracket 42 or rocker/shaft assembly 44 from opposing sides of the mounting bracket 30. The mounting bracket 30 is mounted to the bottom side 18 of the base 14 with one or more mounting bracket bolts 54 and an equivalent number of mounting bracket nuts 52. Generally, the closer the pivot axis 34 is to the riding surface, the smoother directional transitions will be.

One or more pivot stops 46 may be attached to the rocker bracket 42 or rocker/shaft assembly 44. The pivot stops 46 provide an interface between the rocker bracket 42 or rocker/shaft assembly 44 and the bottom side 18 of the base 14 or the mounting bracket 30. The pivot stops 46 further define the first position 38 and second position 40 by limiting the scope of the arc of rotation permitted rocker bracket 42 or rocker/shaft assembly 44.

In different embodiments, the one or more pivot stops 46 may be implemented in a wide variety of configurations. In some embodiments, the pivot stops 46 may further be formed of urethane or other equivalent material having rebound qualities as known in the art. Some embodiments, the pivot stops 46 may be easily changeable by the rider or user to accommodate various user preferences and skill levels. For example, the rider or user may change pivot stops 46 so as to selectably increase or decrease the scope of the arc of rotation. As used herein, "changeable", when referring to a part such as the one or more pivot stops 46, means that the part can be removed and replaced without damaging the part using the skill and tools ordinarily found in homes of most riders of skateboards, caster boards, scooters, and the like.

Figures 5A, 5B:
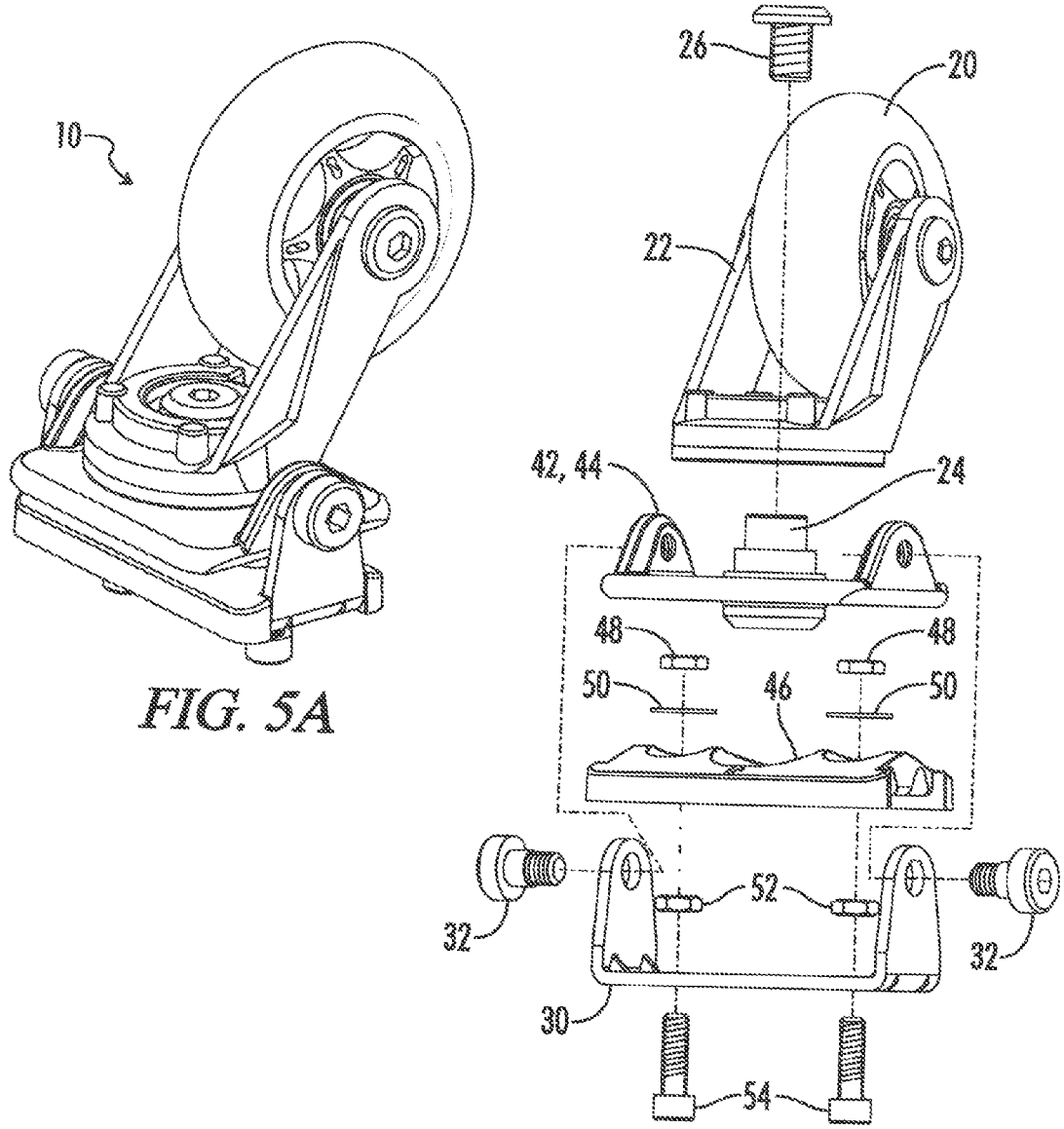
FIG. 5A is an isometric view of another embodiment of the caster assembly of the invention.
FIG. 5B is an exploded isometric view of the caster assembly of FIG. 5A.

Referring now to FIGS. 5A and 5B, in an embodiment as shown a pivot stop 46 is attached directly to the mounting bracket 30 using mounting bracket bolts 54 and mounting bracket nuts 52, as well as interface nuts 48 and interface washers 50. In other embodiments, alternative and equivalent fastening mechanisms as known in the art may be used as well. The rocker bracket 42 or rocker/shaft assembly 44 may be attached to the mounting bracket 30 as previously described. In this embodiment the rocker bracket 42 or rocker/shaft assembly 44 engages the pivot stop 46 when it pivots to either the first position or the second position. The shape or configuration of the pivot stop 46 thereby defines the permissible scope of the arc of rotation for the rocker bracket 42 or rocker/shaft assembly 44. In certain embodiments the pivot stop 46 may be changeable by the rider or user so as to desirably increase or decrease the permissible scope of the arc of rotation.

In certain embodiments the caster shaft 24, rocker bracket 42 and/or rocker/shaft assembly 44 may be allowed to travel around the pivot connection approximately 30-60 degrees. For descriptive purposes, assigning an angle extending downward from the base 14 and toward the riding surface a value of 270 degrees, and with the base for example oriented parallel with the riding surface, the rocker/shaft assembly would in these embodiments be allowed to travel freely between 15 and 30 degrees on either side of 270 degrees depending on the desired performance.

If a 30 degree total swing is used on a ride-on device 12 such as a caster board 12, for example, the caster board 12 will be easier to turn and spin but will generate lower speed. It is similar to the lowest gear on a bicycle. It will generate less speed but there will also be less resistance to rider motions. In contrast, if a total swing of 60 degrees was used it would be similar to the highest speed on a bicycle. There would be more speed with less motion but there would be greater resistance against that motion.

Referring generally now to FIGS. 1-5, operation of the embodiments illustrated may be described. A bi-directional ride-on device 12 having one or more caster assemblies 10 mounted to the undersides 18 of one or more bases 14 or platforms 14 has a first end and a second end corresponding to either direction of movement. When the wheel 20 and wheel bracket 22 of each caster assembly 10 are substantially aligned with a direction of movement, the associated shaft 24 is pivoted to a position corresponding to the direction of movement. Further, when the wheel bracket 22 and shaft 24 are so positioned, a minimum position or height for the base 14 or platform 14 with respect to the riding surface is defined.

The wheel bracket 22 is rotated about the shaft 24 in response to lateral forces supplied to the base 14 or platform 14 by a rider or user of the ride-on device 12. As the wheel bracket 22 rotates away from a substantial alignment with the direction of movement, and up to a ninety degree angle relative to the direction of movement, the height of the base increases with respect to the riding surface. Resultant energy generally corresponding to a weight of the rider or user subsequently is stored in the caster assembly 10 and is released as the platform 14 is forced back to a minimum height with respect to the riding surface, creating propulsion of the ride-on device 12 in the direction of movement.

When the wheel 10 and wheel bracket 22 are aligned at a ninety degree angle relative to the direction of movement, a maximum position or height for the platform 14 with respect to the riding surface is defined. The shaft 24, rocker bracket 42 or rocker/shaft assembly 44 further pivots to an orientation substantially parallel with respect to the riding surface. In this position the rider or user may have a maximum ability or freedom to achieve various maneuvers, dynamic spins and other tricks, as resistance to lateral forces applied by the user is minimal and the ride-on device 12 is generally receptive to control. Correspondingly, in this position the speed or acceleration of the ride-on device will be at a minimum as the energy remains stored until the wheel bracket 22 moves back toward substantial alignment with either direction of movement.

When the wheel 20 and wheel bracket 22 are rotated more than a ninety degree angle with respect to the direction of movement previously described, the ride-on device is functional to maneuver and accelerate in equivalent fashion in an opposing direction of movement. The shaft 24, rocker bracket 42 or rocker/shaft assembly 44 pivots about the permissible arc 36 of rotation from the initial position to the opposing position on the arc. The wheel bracket 22 subsequently seeks to substantially align itself with the new direction of movement, wherein a minimum position or height of the platform 14 with respect to the riding surface is attained equivalent to the minimum position associated with the previous direction of movement. Operation of the ride-on device 12 in this direction of movement generally corresponds to the operation for the previous direction as described.

As may be understood from the foregoing embodiments as described, the caster assemblies 10 have a bidirectional quality in large part because there is no constant acute angle for the caster shaft 24 with respect to any given point on the bottom side 18 of the platform 14. Rotating the rocker/shaft assembly 44 or caster shaft 24 toward the first position corresponds with operating the ride-on device 12 in a first direction and rotating the rocker/shaft assembly 44 or caster shaft 24 toward the second position corresponds with operating the ride-on device in a second direction. The first direction of movement is associated with a first position of the wheel bracket 22 in substantial alignment with the first direction of movement. The second direction of movement in contrast is associated with a second position of the wheel bracket 22 in substantial alignment with the second direction of movement. The wheel bracket 22 forms an acute angle in each case with respect to a vector corresponding to the associated direction of movement and extending along the platform 14 to the attachment with the mounting bracket 30. In this manner the caster assembly 10 always seeks a minimum position for the platform 14 with respect to the riding surface that corresponds to the direction of movement.

In the particular embodiment of the invention specifically illustrated in FIG. 1, the bi-directional ride-on device 12 has two bases 14 connected by a connecting element 56 and having at least one caster assembly 10 attached to the bottom side 18 of each base 14. In various embodiments, bases 14 may be adapted to support a rider's feet. For example, bases 14 may be of sufficient strength to support a rider and may be made of a material having a relatively high coefficient of friction with the sole of a typical shoe that may be worn when riding a ride-on device 12 of the embodiment. The caster assembly 10 may also work with numerous other embodiments of ride-on devices 12.

Figure 6:
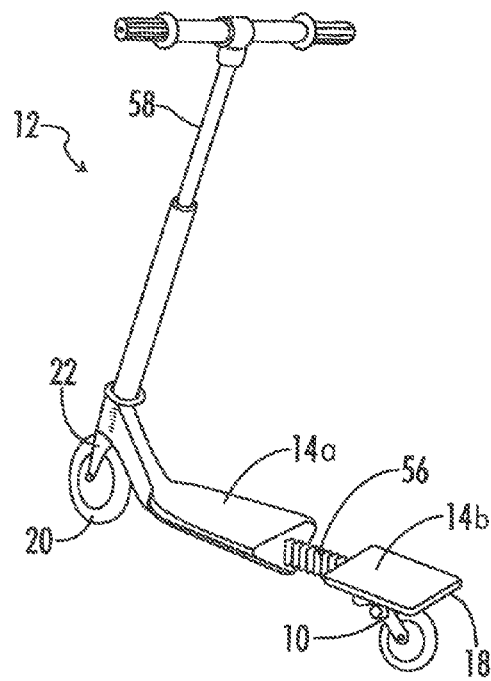
FIG. 6 is an isometric view of an alternative embodiment of a ride-on device having a caster assembly of the invention attached.

FIG. 6 illustrates a bi-directional ride-on device 12 having a first base 14a and a second base 14b aligned along an axis coincident with either direction of movement. A connecting element 56 having elastic properties is connected between the two bases 14a, b. In this embodiment, the first base 14a is attached to a steering column 58 having a wheel bracket 22 such that the wheel 20 is able to pivot about the axis of the steering column 58. A bi-directional propulsion caster assembly 10 is attached to the underside 18 of the second base 14b, in the embodiment shown, and permits the rider to sustain motion in either direction of the ride-on device 12 without taking his or her feet off of the bases 14a, b.

Figure 7:
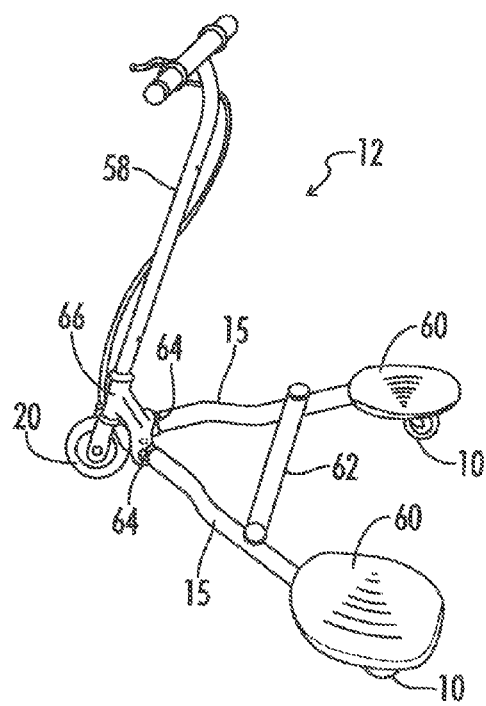
FIG. 7 is an isometric view of another alternative embodiment of a ride-on device having a caster assembly of the invention attached.

FIG. 7 illustrates a bi-directional ride-on device 12 having a first member 15 and a second member 15 aligned along an axis generally transverse to either direction of movement, each member 15 having a foot platform 60 to support a rider. In particular, one of skill in the art will recognize that each foot platform 60 should have sufficient surface area and structural rigidity so as to support a rider's feet during use of the device 12. The members 15 are each attached to a bracket 66, in this embodiment, the attachments being pins or hinges 64 that permit the members 15 to pivot laterally in either direction while steering column 58 remains at the same nearly-vertical angle. There is also a support element 62, in this embodiment, pivotably attached on one end to a central portion of the first member 15 and on the other end to a central portion of the second member 15. The bracket 66 also is attached to a steering column 58, in this embodiment, and a wheel 20 that is able to rotate about the axis of the steering column 58. There are two bi-directional propulsion caster assemblies 10, in this embodiment, one attached to the underside of each foot platform 60, to permit the rider to sustain a forward motion in the ride-on device 12 without taking his or her feet off of the platforms 60.

A number of embodiments of the present invention have been presented herein. However, while certain embodiments of ride-on devices as contemplated by this invention may require more than one wheel to operate, only one bi-directional propulsion caster assembly as described may be required. The invention may be used in the context of a device that is not ridden, such as a cart or wagon. In other embodiments, the invention could provide for a caster assembly using blades for use on ice rather than wheels.

Thus, although there have been described particular embodiments of the present invention of a new and useful bidirectional propulsion caster it is not intended that such references be construed as limitations upon the scope of this invention except as set forth in the following claims.

What is claimed is:

1. A bi-directional ride-on apparatus for use by a rider on a riding surface, the apparatus comprising:
   a plurality of base members, the plurality of base members each having a bottom surface and a top surface adapted to support the feet of a rider;
   at least one connecting element connecting the base members; and
   at least one caster assembly mounted to the bottom surface of at least one base member, the at least one caster assembly comprising:
      a mounting bracket attached to the bottom surface, the mounting bracket defining a single pivot axis that extends in a generally transverse direction across the bottom surface;
      a caster shaft having a caster shaft axis, the caster shaft attached to the mounting bracket along the pivot axis so that the caster shaft can pivot about the pivot axis along an arc between a first position and a second position on opposing sides of an axis that is perpendicular to a horizontal plane of the base member;
      a wheel bracket mounted to the caster shaft such that the wheel bracket rotates about the caster shaft axis; and
      a wheel mounted to the wheel bracket for rotation about a wheel axis that is angularly offset from the caster shaft axis,
      wherein the apparatus has only two wheels, and one wheel is in front of the other wheel relative to the direction of movement of the ride-on apparatus along the riding surface.

2. The bi-directional ride-on apparatus of claim 1, wherein the connecting element has elastic properties.

3. The bi-directional ride-on apparatus of claim 1, wherein the distance between the first position and the second position is approximately 30-60 degrees.

4. The bi-directional ride-on apparatus of claim 1, wherein the top surfaces are of a sufficient strength to support a rider and have a relatively high coefficient of friction with the sole of a shoe.

5. The bi-directional ride-on apparatus of claim 1, wherein the caster assembly permits the rider to sustain motion without taking the rider's feet off of the top surfaces.

6. The bi-directional ride-on apparatus of claim 1, wherein the apparatus has two base members and each base member has only one caster assembly.

7. The bi-directional ride-on apparatus of claim 6, wherein when the wheel brackets rotate around the caster shafts while the wheels are in contact with the riding surface, the base members are caused to rise and fall with respect to the riding surface.

8. The bi-directional ride-on apparatus of claim 1, wherein the caster shaft is attached to the mounting bracket along the pivot axis through a rocker bracket that is permitted to pivot along the arc.

9. The bi-directional ride-on apparatus of claim 8, wherein one or more changeable pivot stops are attached to the rocker bracket and are effective to limit the scope of the arc.

10. A method of operating a bi-directional ride-on apparatus comprising:
   providing the bi-directional ride-on apparatus of claim 1;
   standing on the top surfaces;
   moving the bi-directional ride-on apparatus in a direction of movement; and
   rotating the wheel bracket with respect to the caster shaft by applying forces transverse to the direction of movement to the top surfaces.

11. A bi-directional ride-on apparatus for use by a rider on a riding surface, the apparatus comprising:
   a platform having a bottom surface and a top surface adapted to support the feet of a rider; and
   at least one caster assembly mounted to the bottom surface of the platform, the at least one caster assembly comprising:
      a mounting bracket attached to the bottom surface, the mounting bracket defining a single pivot axis that extends in a generally transverse direction across the bottom surface;
      a caster shaft having a caster shaft axis, the caster shaft attached to the mounting bracket along the pivot axis so that the caster shaft can pivot about the pivot axis along an arc between a first position and a second position on opposing sides of an axis that is perpendicular to a horizontal plane of the bottom surface of the ride-on device;
      a wheel bracket mounted to the caster shaft such that the wheel bracket rotates about the caster shaft axis; and
      a wheel mounted to the wheel bracket for rotation about a wheel axis that is angularly offset from the caster shaft axis,
   wherein the apparatus has only two wheels, and one wheel is in front of the other wheel relative to the direction of movement of the ride-on apparatus.

12. The bi-directional ride-on apparatus of claim 11, wherein the distance between the first position and the second position is approximately 30-60 degrees.

13. The bi-directional ride-on apparatus of claim 11, wherein the top surface is of a sufficient strength to support a rider and has a relatively high coefficient of friction with the sole of a shoe.

14. The bi-directional ride-on apparatus of claim 11, wherein the caster assembly permits the rider to sustain motion without taking the rider's feet off of the top surface.

15. The bi-directional ride-on apparatus of claim 11, wherein the apparatus has only two caster assemblies.

16. The bi-directional ride-on apparatus of claim 15, wherein when the wheel brackets rotate around the caster shafts while the wheels are in contact with the riding surface, the platform is caused to rise and fall with respect to the riding surface.

17. The bi-directional ride-on apparatus of claim 11, wherein the caster shaft is attached to the mounting bracket along the pivot axis through a rocker bracket that is permitted to pivot along the arc.

18. The bi-directional ride-on apparatus of claim 17, wherein one or more changeable pivot stops are attached to the rocker bracket and are effective to limit the scope of the arc.

19. A method of operating a bi-directional ride-on apparatus comprising:
   providing the bi-directional ride-on apparatus of claim 11;
   standing on the platform;
   moving the bi-directional ride-on apparatus in a direction of movement; and
   rotating the wheel bracket with respect to the caster shaft by applying forces transverse to the direction of movement to the platform.

* * * * *